(12) United States Patent
Rubenstein

(10) Patent No.: US 7,516,917 B2
(45) Date of Patent: Apr. 14, 2009

(54) MANAGEMENT DEVICE FOR EXCESS CABLING

(75) Inventor: Brandon Aaron Rubenstein, Loveland, CO (US)

(73) Assignee: Hewlett-Packard Development, L.P., Houston, TX (US)

( * ) Notice: Subject to any disclaimer, the term of this patent is extended or adjusted under 35 U.S.C. 154(b) by 821 days.

(21) Appl. No.: 10/867,024

(22) Filed: Jun. 14, 2004

(65) Prior Publication Data

US 2005/0274842 A1 Dec. 15, 2005

(51) Int. Cl.
*B65H 57/04* (2006.01)

(52) U.S. Cl. .................... 242/615.3; 242/417.3

(58) Field of Classification Search ............. 242/615.1, 242/615.3, 417.3; 191/12 R
See application file for complete search history.

(56) References Cited

U.S. PATENT DOCUMENTS 5,877,936 A * 3/1999 Nishitani et al. ............ 361/600

FOREIGN PATENT DOCUMENTS

| JP | 06314520 A | 11/1994 |
|---|---|---|
| JP | 08265950 A | 3/1995 |
| JP | 07218733 A | 8/1995 |
| JP | 09140040 A | 5/1997 |
| JP | 2002176724 A | 6/2002 |
| JP | 2002325347 A | 11/2002 |
| JP | 2003319538 A | 11/2003 |

* cited by examiner

*Primary Examiner*—William A Rivera

(57) ABSTRACT

A cable management device includes a housing having a forward end, a rearward end, a base, opposing sidewalls, and a pair of vertically-spaced cross-members extending laterally within the housing between the sidewalls. A cable interconnecting electronic devices is routed forward and upwardly around the lower cross-member, rearwardly between the cross-members, rearward and upwardly around the upper cross-member and forwardly out of the housing forward end. The segment of cable extended out of the housing forward end may be pushed longitudinally along the segment back into the cable management device for stowage and subsequently extended back out of the device when needed.

19 Claims, 5 Drawing Sheets

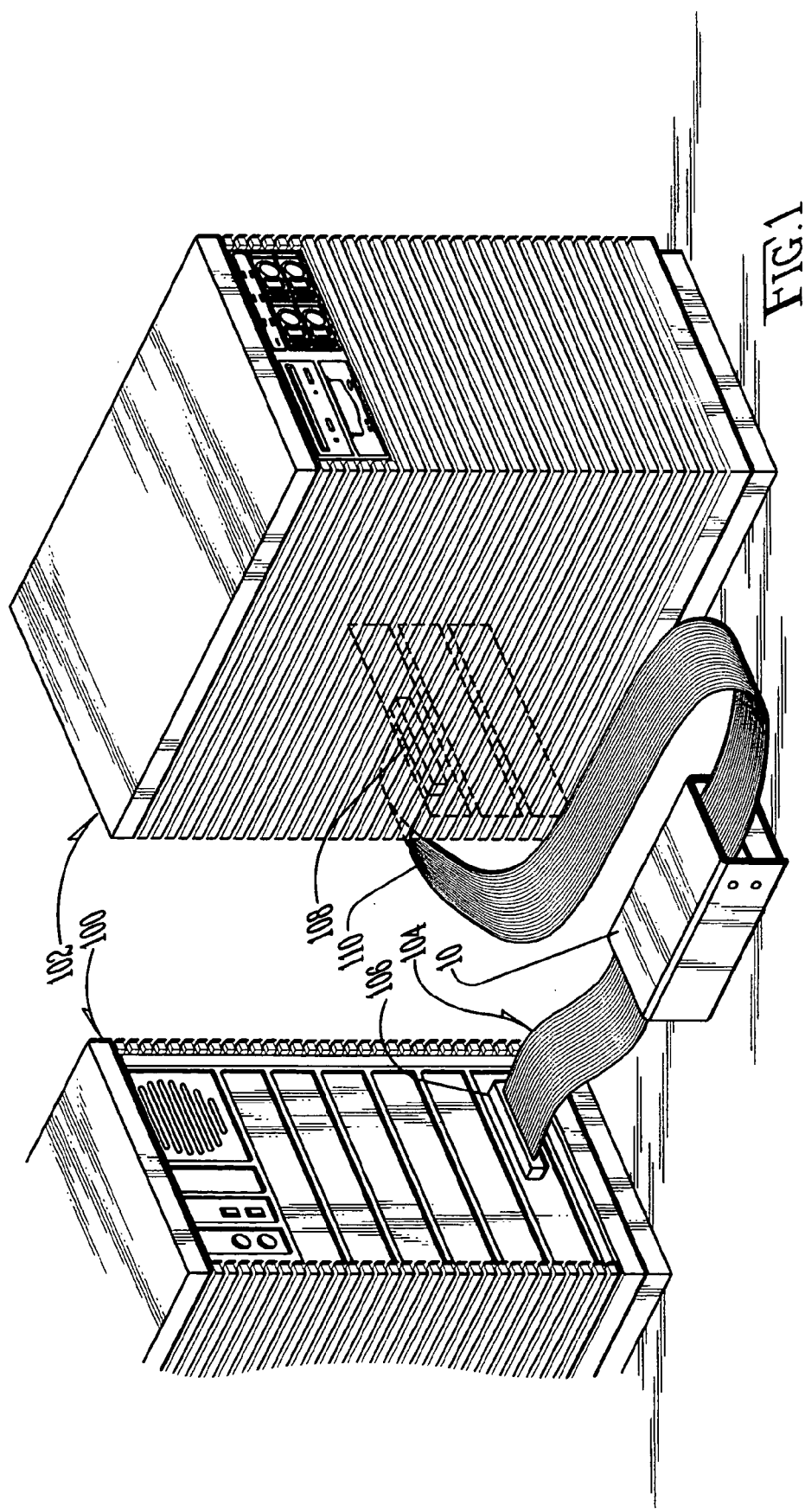

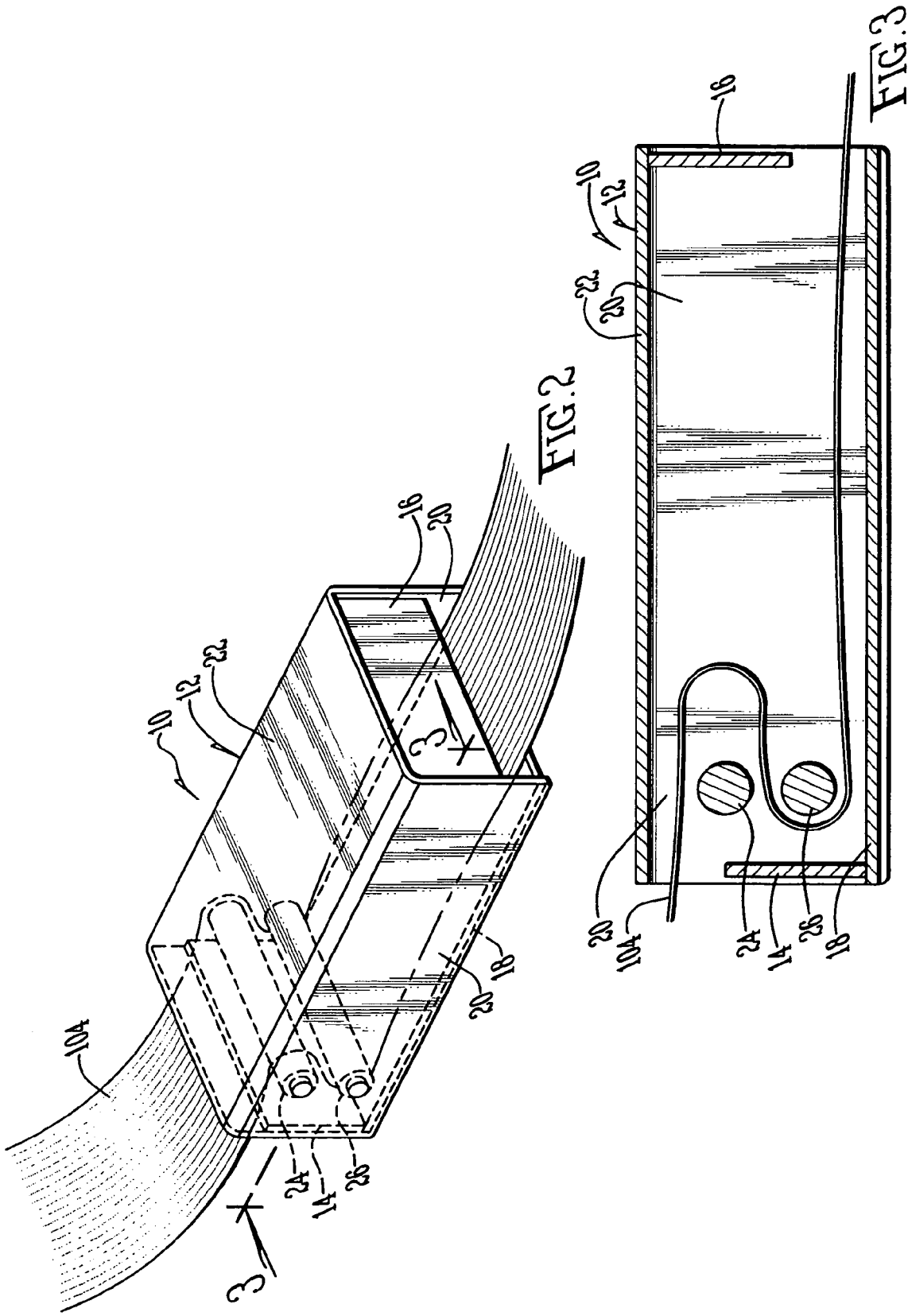

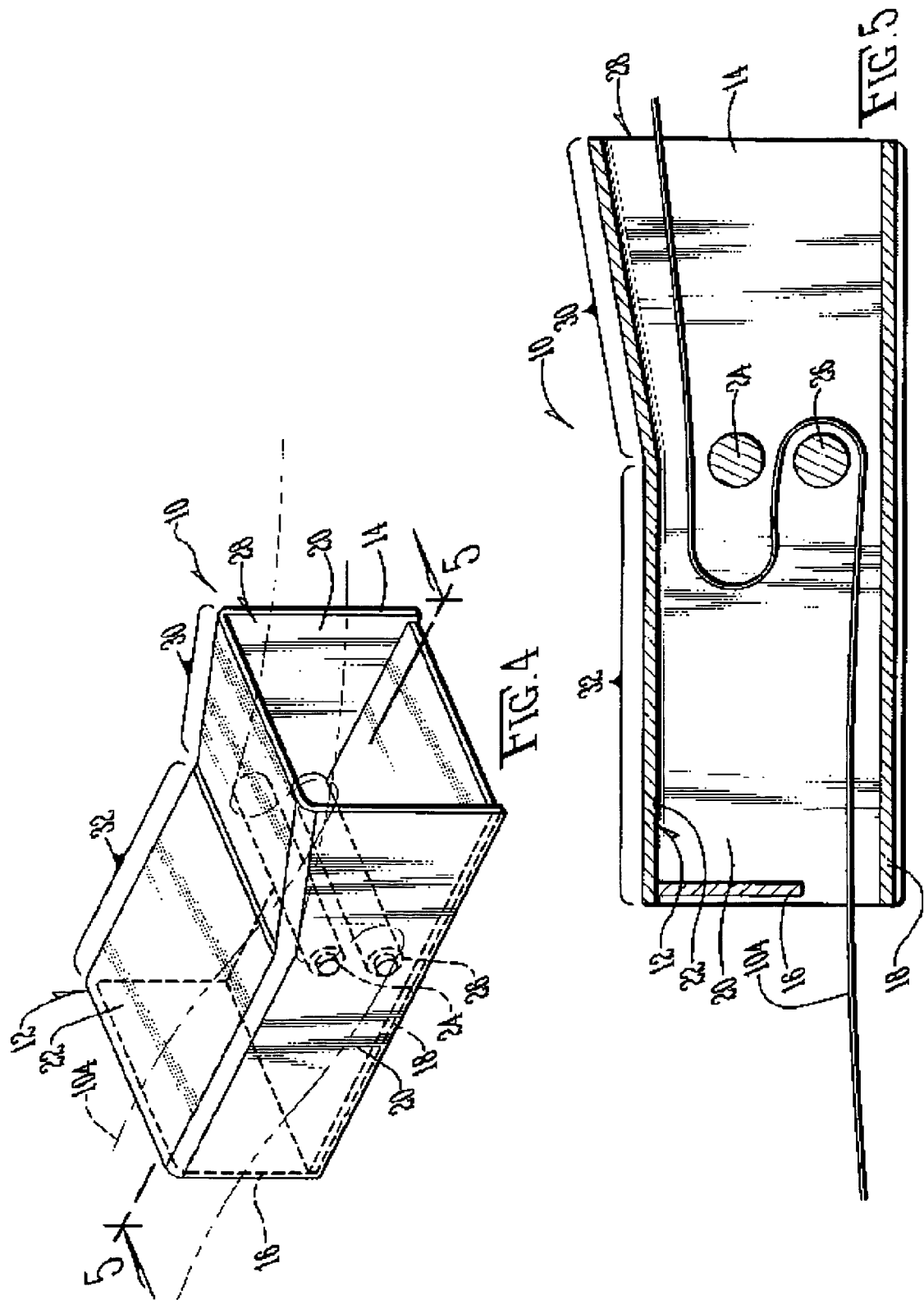

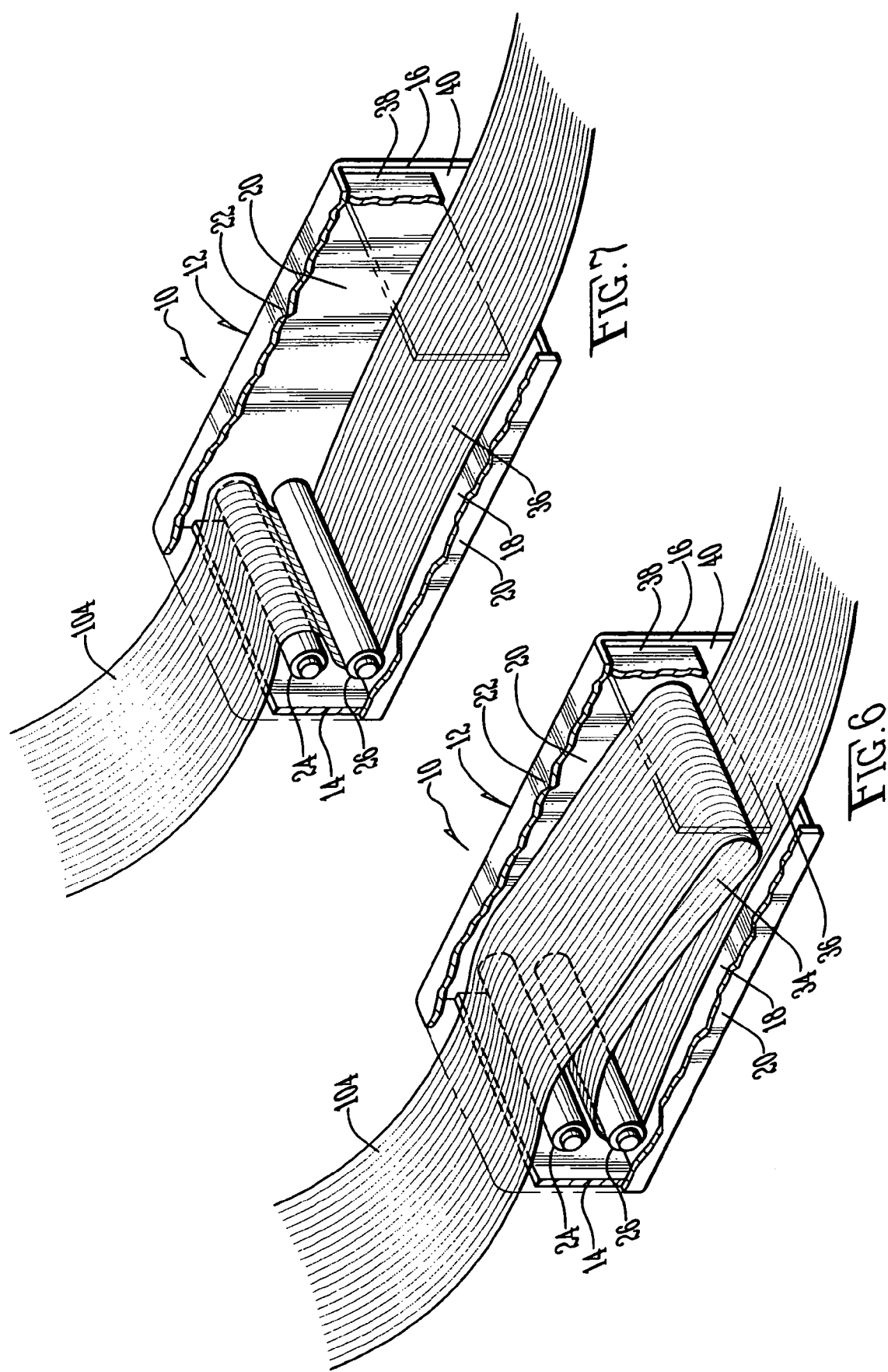

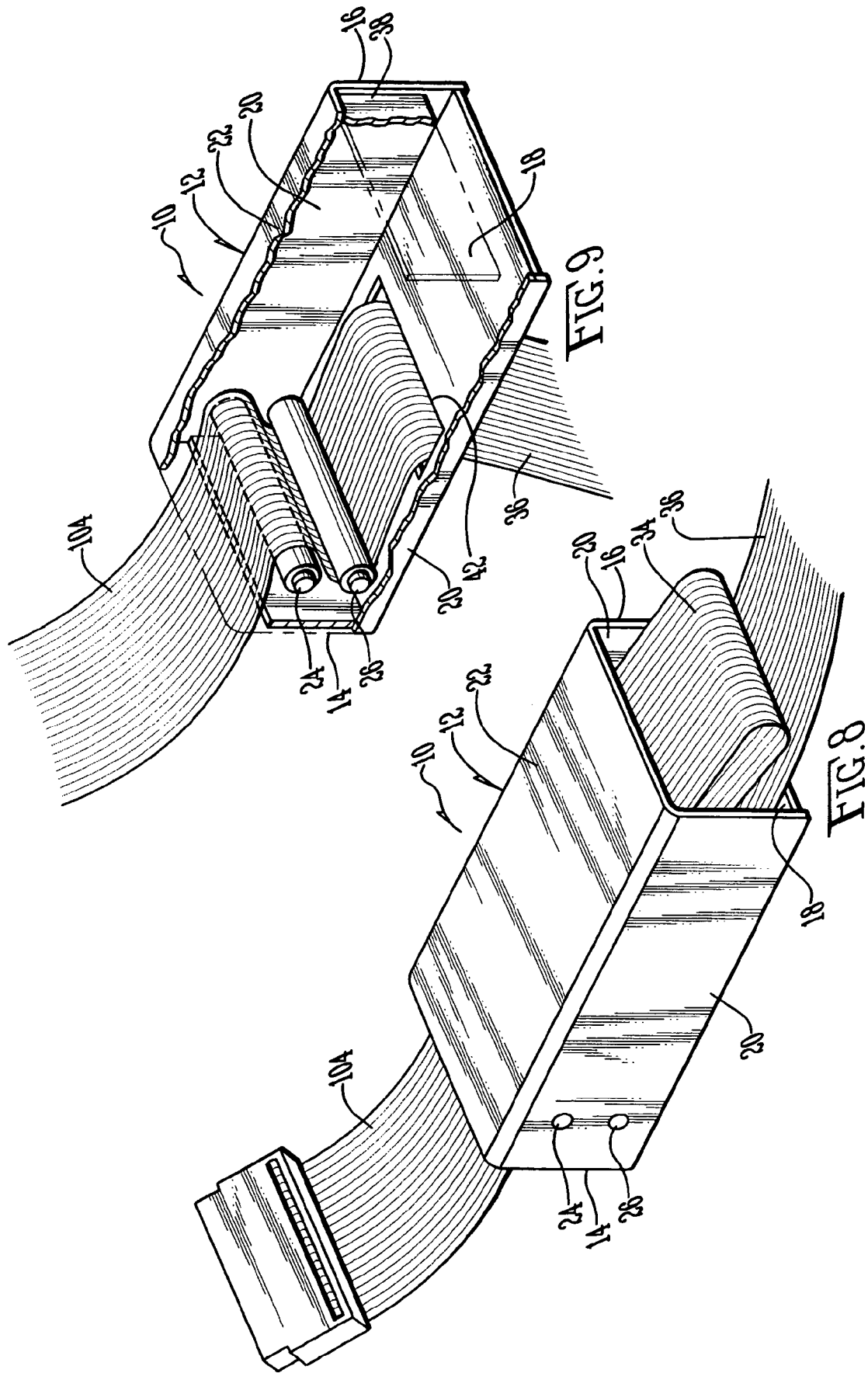

MANAGEMENT DEVICE FOR EXCESS CABLING

BACKGROUND OF THE INVENTION

1. Field of the Invention

The invention relates generally the management of cabling and, more specifically, a cable management device is presented to manage excess lengths of cabling used to transfer data between electronic devices.

2. Discussion of the Related Art

Modern computing systems are becoming more interconnected such that data transfers take place between adjacent units. For example, computer servers forming a local-area network (LAN) or other network are typically connected together with one or more electrical or optical cables that are designed to carry commands and other data therebetween. These servers may be rack-mounted or otherwise stored in spaced relation to one another.

It is often necessary to move interconnected servers towards or away from one another to, for example, perform maintenance on one of the servers. It is desirable leave the cables electrically connected between the servers during such service. Therefore, cables are generally provided with sufficient length as to create slack in the cables when servers are properly stored, so that a range of movement between the servers is provided. This slack, however, may cause the cable to become entangled with other cables or computer system components, which interferes with the movement of a server out of the rack or storage area. Additionally, the entangling of cables makes it difficult to determine the specific route of an individual cable and the servers that are interconnected thereby.

Various devices have been created to manage cable slack. Some common designs include mechanically retracting arms or spring-loaded roller devices that capture a section of cabling and move the section to a designated location. While these devices have some utility, their mechanical nature leads to a number of drawbacks, including required maintenance of moving parts, excess bulk and large cost to acquire. Some mechanical-type cable management devices also require the cabling to be pre-built into the device, such that the cable is difficult to remove.

DESCRIPTION OF THE DRAWINGS

FIG. 1 is a perspective of a pair of computer servers interconnected with a cable routed through the cable management device;

FIG. 2 is a perspective view of the cable management device of the present invention;

FIG. 3 is a cross-sectional view taken along line 3-3 showing one path of cable routing through the cable management device;

FIG. 4 is a perspective view of the cable management device having an upwardly flared opening;

FIG. 5 is a cross-sectional view taken along line 5-5 showing one path of cable routing through the cable management device having an upwardly flared opening;

FIG. 6 is a cut-away perspective view of the cable management device showing a segment of the cable in stowage position;

FIG. 7 is a cut-away perspective view of the cable management device showing a segment of the cable in extended position;

FIG. 8 is a cut-away perspective view of the cable management device without a rear wall showing a segment of the cable in stowage position; and FIG. 9 is a cut-away perspective view of the cable management device showing a segment of the cable in stowage position and routed into the device through the base.

DETAILED DESCRIPTION

A cable management device 10 is shown in FIG. 1 in use with a first computer server 100 and a second computer server 102. An electrical or optical cable 104, such as a ribbon cable, has a first connector 106 connected with the first computer server 100, a second connector 108 connected with the second computer server 102 and a body section 110 extending therebetween. The ribbon cable is shown routed through the cable management device 10. Connectors 106, 108 may, for example, be connected to a motherboard or backplane board of the servers 100, 102 such that command signals and other data may be transferred between the servers.

FIGS. 2 and 3 show the cable management device 10 having a housing 12 formed with a forward end 14, a rearward end 16, a base 18, a pair of sidewalls 20 extending upward from the base and a roof 22 spanning between the sidewalls 20. The device 10 also includes an upper cross-member 24 and a lower cross-member 26 extending laterally between the sidewalls 20. The interior width of the housing 12 is preferably sized to allow various cabling to be extended therethrough, such as ribbon cables. The cross-members 24, 26 are also ideally formed in the shape of cylindrical rods such that the cable 104 wraps smoothly around the cross-members 24, 26 when the cable 104 is put under tension. In an alternative arrangement, the housing 12 may be formed without roof 22 such that the cable 104 routed within the housing 12 may be accessed from above the housing 12.

One path for routing the cable 104 through the cable management device 10 is shown in FIG. 3. This path takes the cable 104 from the first computer server 100 into the rearward end 16 of the housing 12, forwardly along the base 18, upwardly and in front of the lower-cross-member 26, rearwardly between the lower-cross-member 26 and the upper cross-member 24, upwardly and behind the upper cross-member 24, forwardly between the upper cross-member 24 and the roof 22, and out of the forward end 14 of the housing 12. It can be seen that the upper cross-member 24 and the lower cross-member 26 are aligned in a vertical plane with one another. This vertical alignment and positioning of the cross-members 24, 26 proximal to the forward end 14 of the housing 12 is designed to maximize the length of the cable 104 that may be routed and stowed within the housing 12. However, the cross-members 24, 26 may be in different vertical planes, i.e., at different distances from the housing forward end 14.

The gap between the upper cross-member 24 and the roof 22 may be designed to be sufficiently small in either width or height as to prevent the second cable connector 108 from traveling into the housing 12 rearward of the upper cross-member 24. To remove the cable 104 from the cable management device 10 in this arrangement, either the first cable connector 106 would have to be of a sufficiently small size as to be routable through the device 10, or the housing roof 22 may be designed to be removably attached to the housing sidewalls 20. For example, the roof 22 may have downwardly extending flanges (not shown) at the sides thereof to overlap with the sidewalls 20, and bores extending through the flanges and sidewalls 20 into which fasteners (not shown) may be mounted to couple the structures together.

The roof 22 of the housing 12 may also have a upwardly flared opening 28, as shown in FIGS. 4 and 5. The opening 28 is formed by a section 30 of the roof 22 having an upward slope and extending from a main roof section 32. The sidewalls 20 also have increasing height in the region of the opening 28 in the direction of the housing forward end 14 to intersect with the section 30. The upwardly flared opening 28 allows a user to extend the cable 104 with less resistance when pulling the cable 104 at an angle above the horizontal.

FIGS. 6 and 7 show the extension and retraction of a segment of the cable 104 into and out of the housing 12. It should be understood that more than one cable 104 may be routed together in the cable management device 10 if desired. A portion of the cable 104 that is shown extended out of the housing 12 in FIG. 7, and subsequently inserted into the housing 12 in FIG. 6, is identified as the stowage or "fold-over" section 34 of the cable. Likewise, the section of the cable 104 shown routed below and rearward of the lower-cross-member 26 and extending out of the housing rearward end 16 is identified as the lead section 36. Optionally, the housing 12 may have a rear wall 38 extending downward from the roof 22 to maintain the fold-over section 34 within the housing when inserted therein. An entrance opening 40 is formed between the rear wall 38 and the base 18 to allow the cable lead section 36 to enter the housing 12.

For the extension and retraction of the cable 104 to function as shown in FIGS. 6 and 7, the cable 104 should have some stiffness or rigidity along at least the length of the fold-over section 34 that is extended out of the housing forward end 14. This stiffness allow for pushing longitudinally along the length of the cable 104 at a location that is at least somewhat distal from where the cable 104 extends over the upper-cross-member 24.

As can been seen in FIG. 7, when the fold-over section 34 of the cable 104 is pulled out of the housing forward end 14 to full extension, the cable 104 wraps tightly around the upper and lower cross-members 24, 26. So long as the cable 104 routed out of the housing rearward end 16 is likewise at full extension, and firmly held, then the pulling of the fold-over section 34 does not cause movement of the cable lead section 36. This lack of movement of the lead section 36 fixes the length of the cable 104 that may be extended out of the housing forward end 14, and consequently, sets the maximum distance the second computer server 102 can be moved away from the cable management device 10. When the cable 104 extended out of the housing forward end 14 is pushed longitudinally along the length thereof above the upper cross-member 24 towards the housing 12, the fold-over section 34 enters the housing 12 and doubles back on itself until the section 34 abuts the rear wall 38. At this point, the cable 104 is in the fully retracted position.

FIG. 8 shows another arrangement for the housing 12 where the rear wall 38 is removed. The cable 104 may be pulled to full extension in the same fashion as is shown in FIG. 6, but retraction of the cable 104 may push the fold-over section 34 beyond the rearward end 16 of the housing 12. Thus, the length of cable retraction is not limited by the length of the housing 12 between the forward end 14 and the rear wall 38.

The housing 12 may also be formed with an opening 42 in the base 18, as shown in FIG. 9, when it is necessary for the cable 104 to enter the cable management device 10 from below. One example would be when the device 10 is mounted in a rack-type structure above a floor or platform where the first computer server 100 is located. The device of FIG. 9 would function in the same way as that shown in FIGS. 6 and 7 in terms of extension and retraction of the cable 104, but with less angle of wrap of the cable 104 around the lower cross-member 26. The opening 42 should not be so far forward in the housing 12 that the cable 104 does not contact the lower-cross-member 26.

Thus, it can be seen that the cable management device 10 provides a simple and cost-effective way of managing excess cabling between electronic devices. It is to be understood that the device 10 may be used with other electronic devices besides the computer serves 100, 102 of FIG. 1, so long as the cabling interconnecting the electronic devices can be routed within the device 10 and has sufficient stiffness to be pushed back into the housing 12 from the extended position. Also, although the device 10 is shown to be located on a horizontal surface, references to vertical and horizontal positions of components of the device 10 may change if the device is oriented with the base 18 on a non-horizontal plane.

Since certain changes may be made in the above invention without departing from the scope hereof, it is intended that all matter contained in the above description or shown in the accompanying drawing be interpreted as illustrative and not in a limiting sense. It is also to be understood that the following claims are to cover certain generic and specific features described herein.

The invention claimed is:

1. A cable management device for facilitating the extension of a segment of cabling away from the device and the stowage of the cabling segment at least partially within the device, comprising:

a housing having a forward end, a rearward end, a base and opposing side regions extending from the base, the housing defining an interior;

an upper cross-member and a lower cross-member spanning laterally between the opposing side regions, the upper cross-member and the lower cross-member being operably configured to receive a portion of the cabling thereon; and a roof interconnecting the opposing side regions above the upper cross-member;

whereby the cabling is routed around the upper cross-member and the lower cross-member and the housing is configured to removably stow at least a portion of the segment of cabling in the interior of the housing;

wherein the housing further has a rear wall at the rearward end of the housing to maintain the portion of the segment of cabling pushed into the forward end of the housing within the housing.

2. The device of claim 1, wherein the side regions form sidewalls.

3. The device of claim 1, wherein the upper and lower cross-members are cylindrical rods.

4. The device of claim 1, wherein the upper and lower cross-members are aligned in a vertical plane.

5. The device of claim 1, wherein the housing is in the shape of a rectangular box.

6. The device of claim 1, wherein the roof has an upwardly flared opening proximal to the forward end of the housing to facilitate extension of the cabling segment outward and upward from the housing forward end.

7. The device of claim 1, wherein a gap formed between the roof and the upper cross-member is of a sufficiently small size as to prevent a cable connector from traveling into the housing through the gap.

8. The device of claim 1, wherein the rear wall partially encloses the rearward end of the housing, thereby forming an opening between the rear wall and the base such that cabling may be routed therethrough into the housing.

9. A system for managing excessive cabling length, comprising:
- a cable stowage container having a forward end, a rearward end, a base, and opposing sidewalls;
- an upper cross-member and a lower cross-member spanning laterally between the opposing sidewalls; and
- a cable having a first end and a second end, the first end electrically connected to a first device and the second end electrically connected to a second device, and a body section therebetween routed through the upper cross-member and the lower cross-member of the stowage container;
- wherein the body section of the cabling has a stiffness sufficient to facilitate movement of a segment of cabling routed out of the forward end of the stowage container back into the stowage container by pushing longitudinally along the length of the cabling;
- wherein the stowage container further has a roof interconnecting the opposing sidewalls above the upper cross-member;
- wherein the stowage container further has a rear wall at the rearward end to maintain a portion of the segment of cabling pushed into the stowage container within the stowage container.

10. The system of claim 9, wherein the cabling comprises ribbon cable having a width defining a major dimension and a height defining a minor dimension.

11. The system of claim 9, wherein the upper and lower cross-members are cylindrical rods.

12. The system of claim 9, wherein the upper and lower cross-members are aligned in a vertical plane.

13. The system of claim 9, wherein the roof has a upwardly flared opening proximal to the forward end of the stowage container to facilitate extension of the cabling segment outward and upward from the stowage container forward end.

14. The system of claim 9, wherein a gap formed between the roof and the upper cross-member is of a sufficiently small size as to prevent a cable connector from traveling into the housing through the gap.

15. The system of claim 9, wherein the rear wall partially encloses the rearward end of the stowage container, thereby forming an opening between the rear wall and the base such that cabling may be routed therethrough into the stowage container.

16. A method of managing excessive length of cabling connecting two electronic devices together, comprising the steps of:
- routing, within a housing having a forward end, a rearward end, a base, opposing sidewalls, a roof interconnecting the opposing sidewalls, a rear wall at the rearward end, and upper and lower cross-members mounted laterally within and spanning the housing, a segment of cabling upwardly and forwardly of the lower cross-member, rearwardly between the upper and lower cross-members, upwardly and rearwardly of the upper cross-member, forwardly above the upper cross-member and out of the forward end of the housing;
- pushing, longitudinally along the length of the cabling towards the housing, at least a portion of a segment of cabling routed out of the forward end of the housing back into the housing for stowage thereof, wherein the rear wall maintains the portion of the segment of cabling pushed into the housing within the housing; and
- pulling, away from the housing, the segment of cabling routed out of the forward end of the housing to extend the portion of the cabling segment stowed within the housing back out of the housing.

17. The method of claim 16, wherein the cabling comprises ribbon cable having a width defining a major dimension and a height defining a minor dimension.

18. The method of claim 16, wherein the step of routing further comprises routing the segment of cabling into the housing at the rearward end thereof.

19. The method of claim 16, wherein the electronics devices are computer servers.

* * * * *

UNITED STATES PATENT AND TRADEMARK OFFICE
CERTIFICATE OF CORRECTION

| | | |
|---|---|---|
| PATENT NO. | : 7,516,917 B2 | Page 1 of 1 |
| APPLICATION NO. | : 10/867024 | |
| DATED | : April 14, 2009 | |
| INVENTOR(S) | : Brandon Aaron Rubenstein | |

It is certified that error appears in the above-identified patent and that said Letters Patent is hereby corrected as shown below:

On the Title page, in field (73), in "Assignee", in Column 1, line 1, after "Development" insert -- Company --.

In column 5, line 32, in Claim 13, after "has" delete "a" and insert -- an --, therefor.

Signed and Sealed this

Fifteenth Day of September, 2009

David J. Kappos
*Director of the United States Patent and Trademark Office*